No. 725,647. PATENTED APR. 21, 1903.
C. H. ALDRIDGE.
STRAIGHT FASHIONING KNITTING MACHINE.
APPLICATION FILED FEB. 10, 1902.
NO MODEL. 9 SHEETS—SHEET 2.
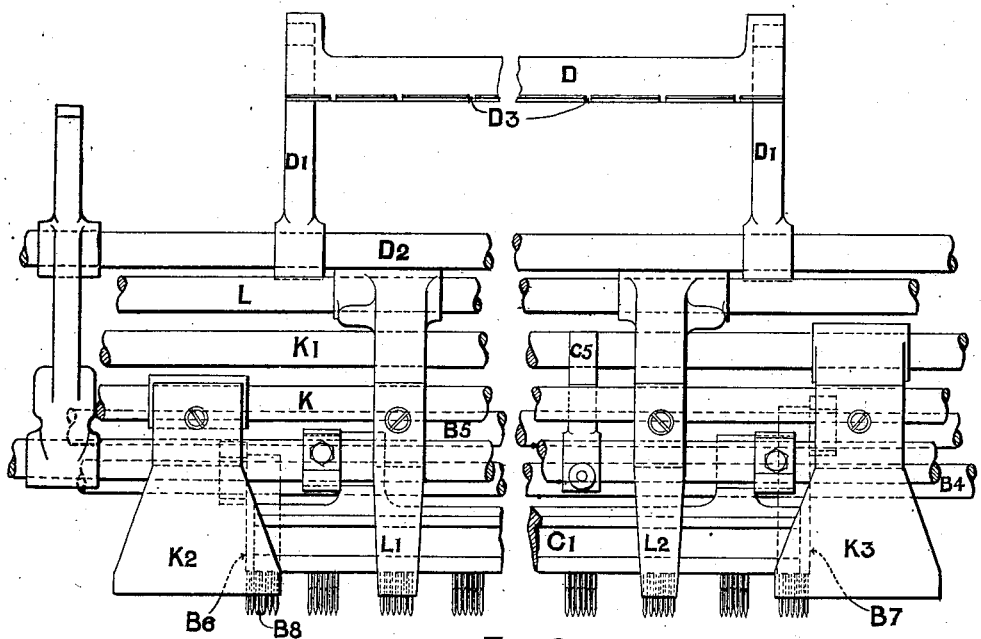
Fig: 2
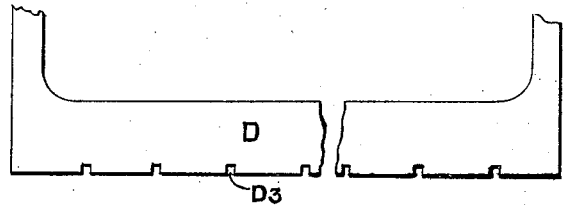
Fig: 3
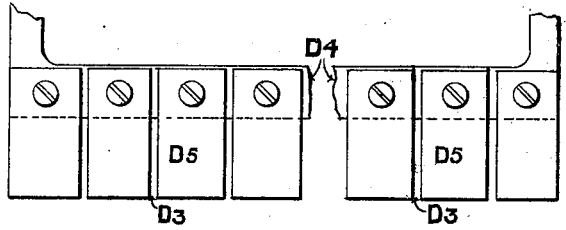
Fig: 4
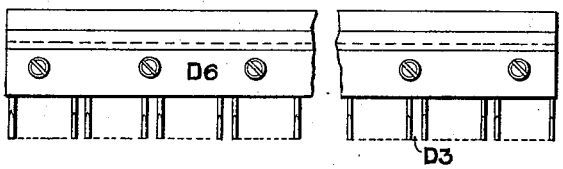
Fig: 5

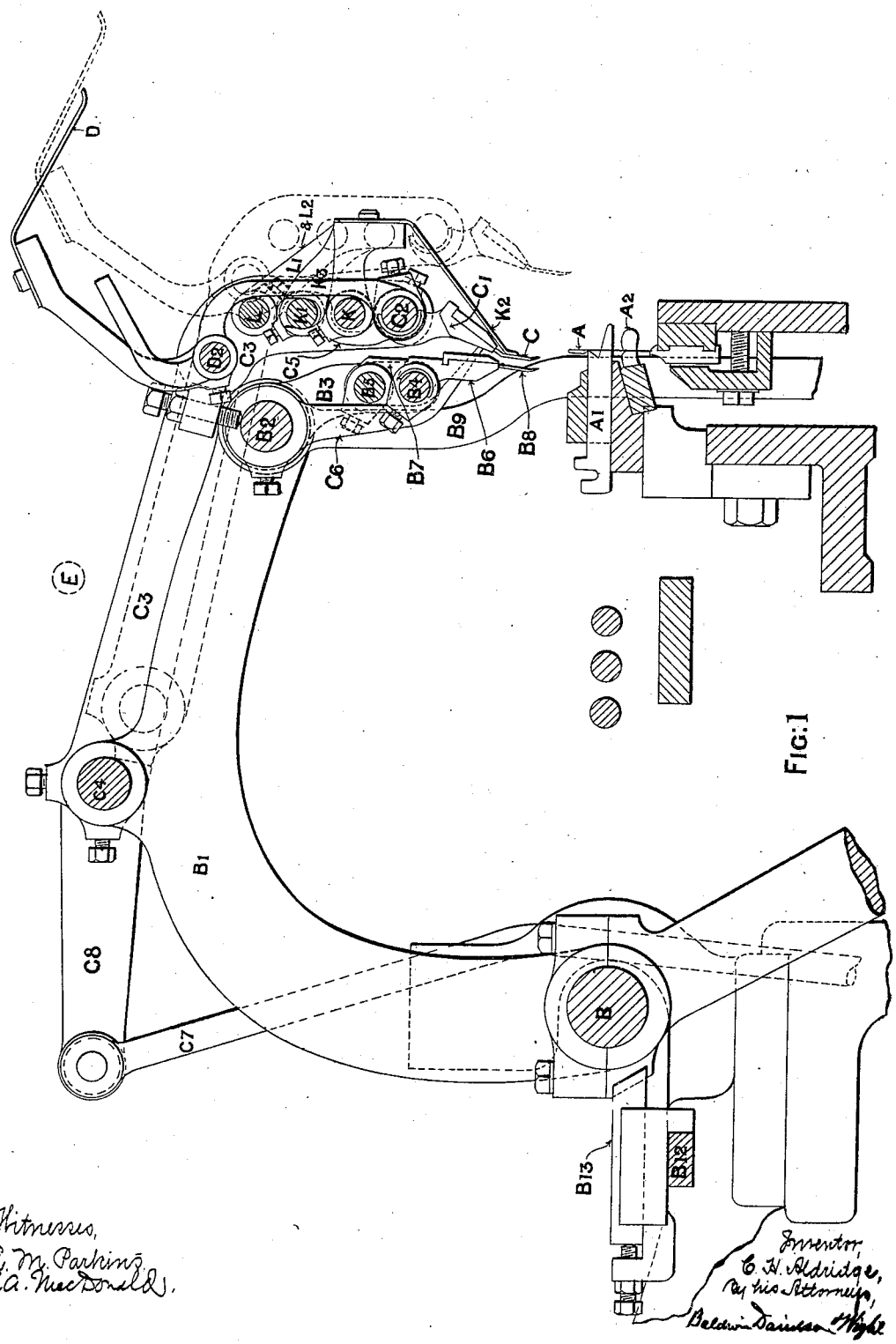

No. 725,647. PATENTED APR. 21, 1903.
C. H. ALDRIDGE.
STRAIGHT FASHIONING KNITTING MACHINE.
APPLICATION FILED FEB. 10, 1902.
NO MODEL. 9 SHEETS—SHEET 3.
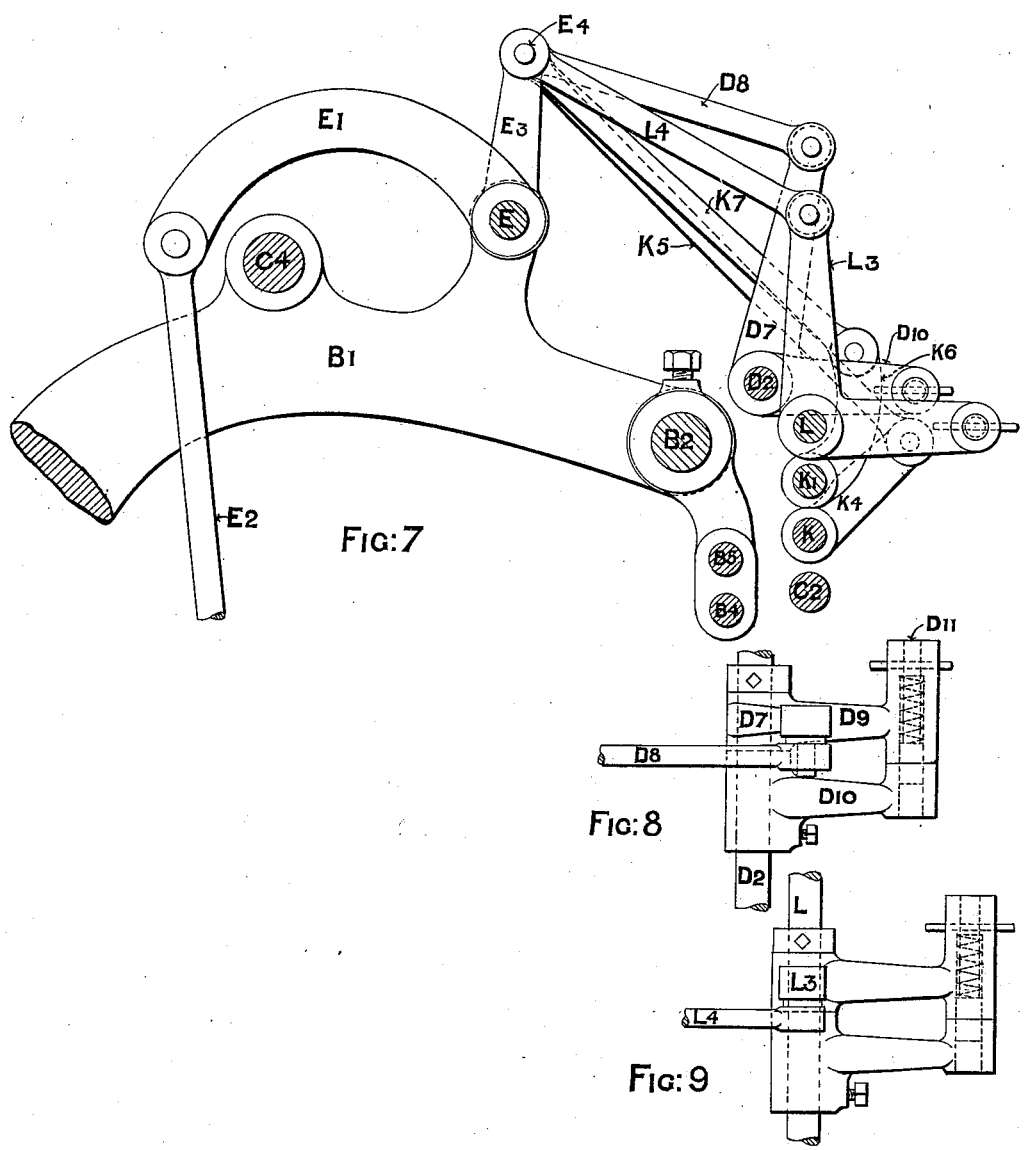

No. 725,647. PATENTED APR. 21, 1903.
C. H. ALDRIDGE.
STRAIGHT FASHIONING KNITTING MACHINE.
APPLICATION FILED FEB. 10, 1902.
NO MODEL. 9 SHEETS—SHEET 4.
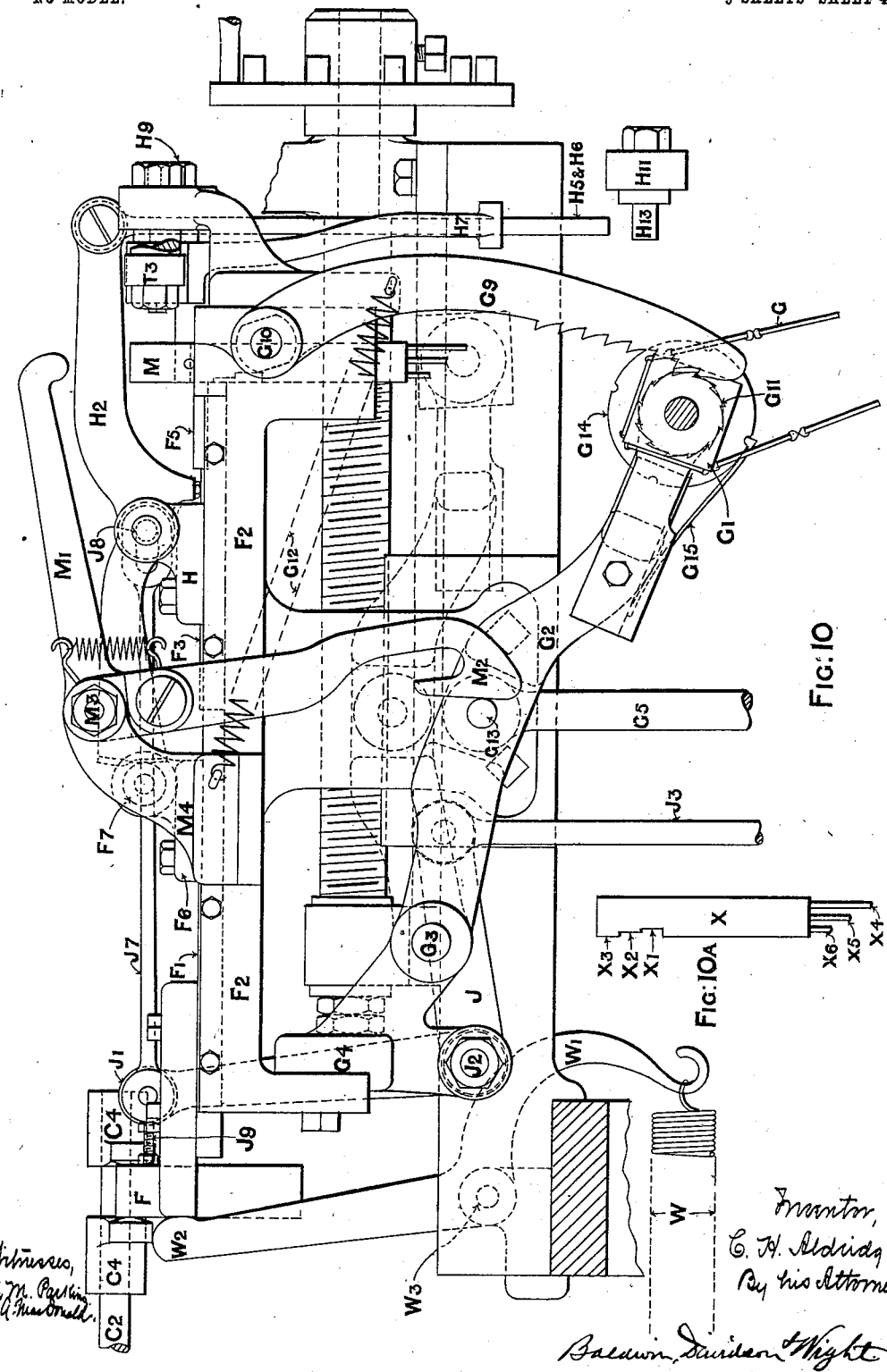

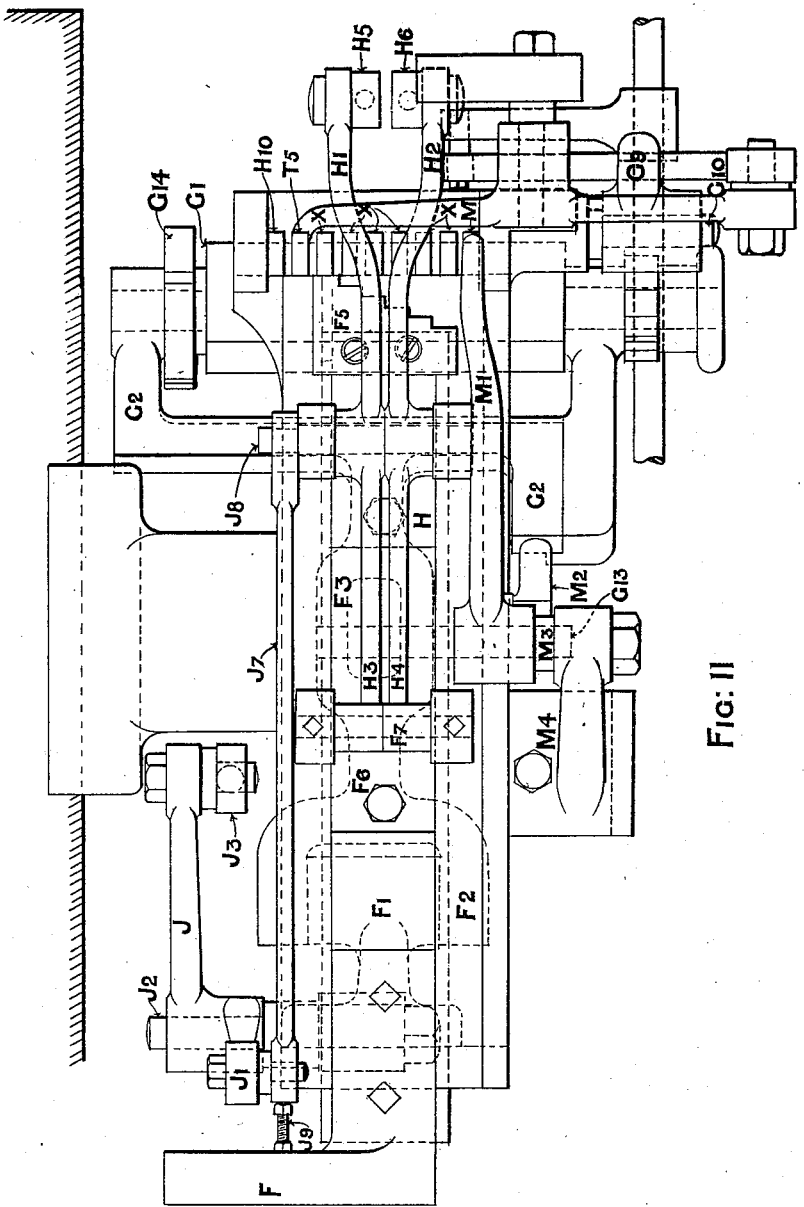

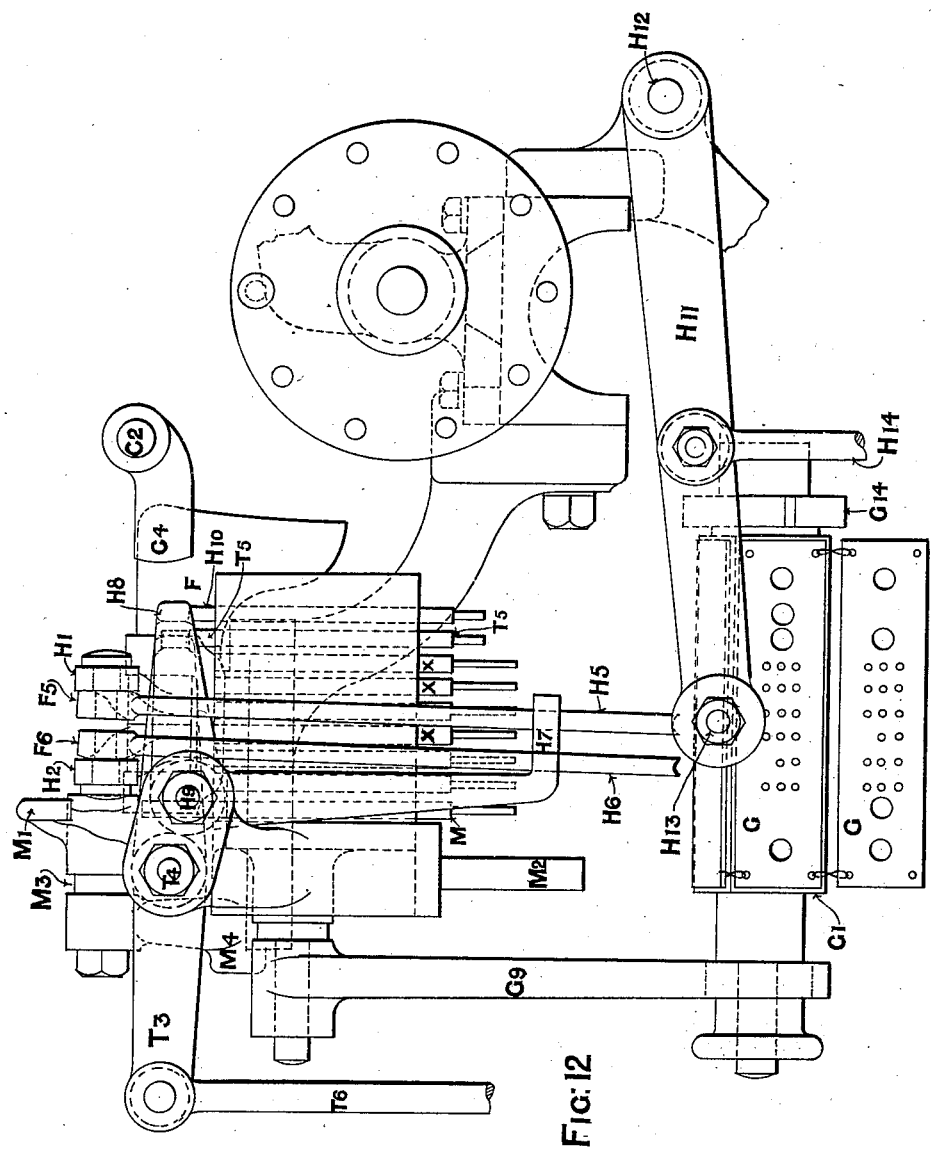

No. 725,647. PATENTED APR. 21, 1903.
C. H. ALDRIDGE.
STRAIGHT FASHIONING KNITTING MACHINE.
APPLICATION FILED FEB. 10, 1902.
NO MODEL. 9 SHEETS—SHEET 7.
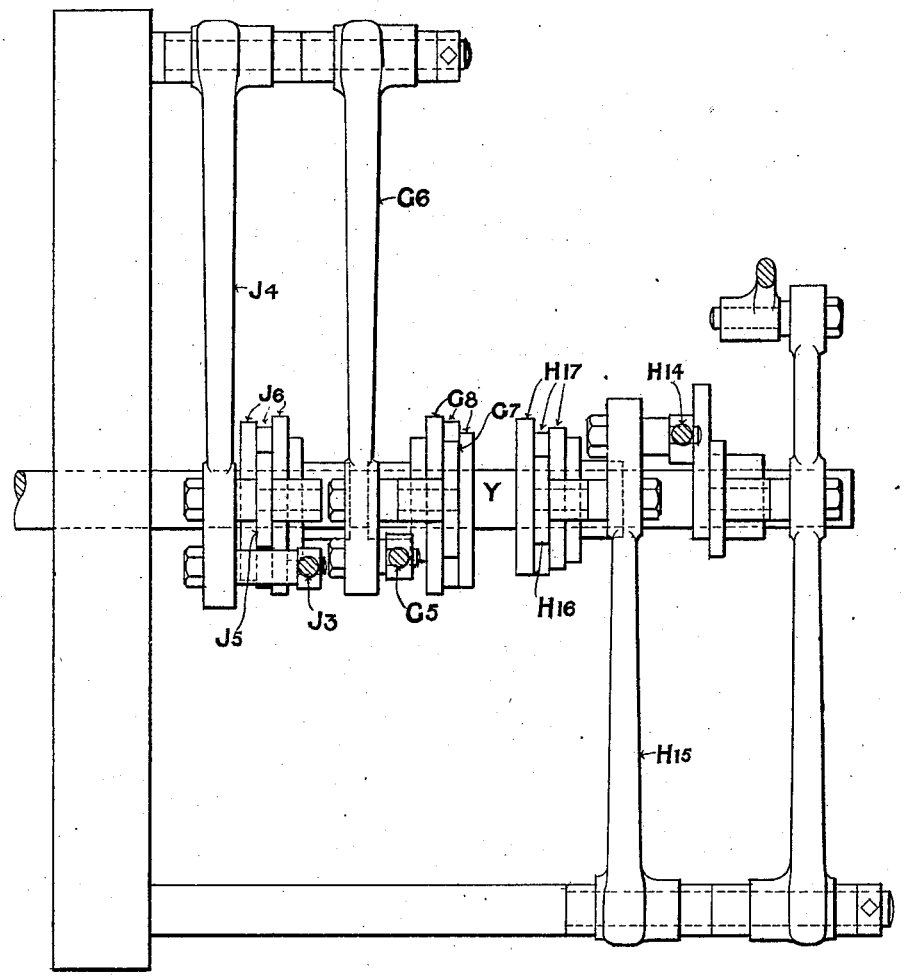
FIG: 13

No. 725,647. PATENTED APR. 21, 1903.
C. H. ALDRIDGE.
STRAIGHT FASHIONING KNITTING MACHINE.
APPLICATION FILED FEB. 10, 1902.
NO MODEL. 9 SHEETS—SHEET 8.
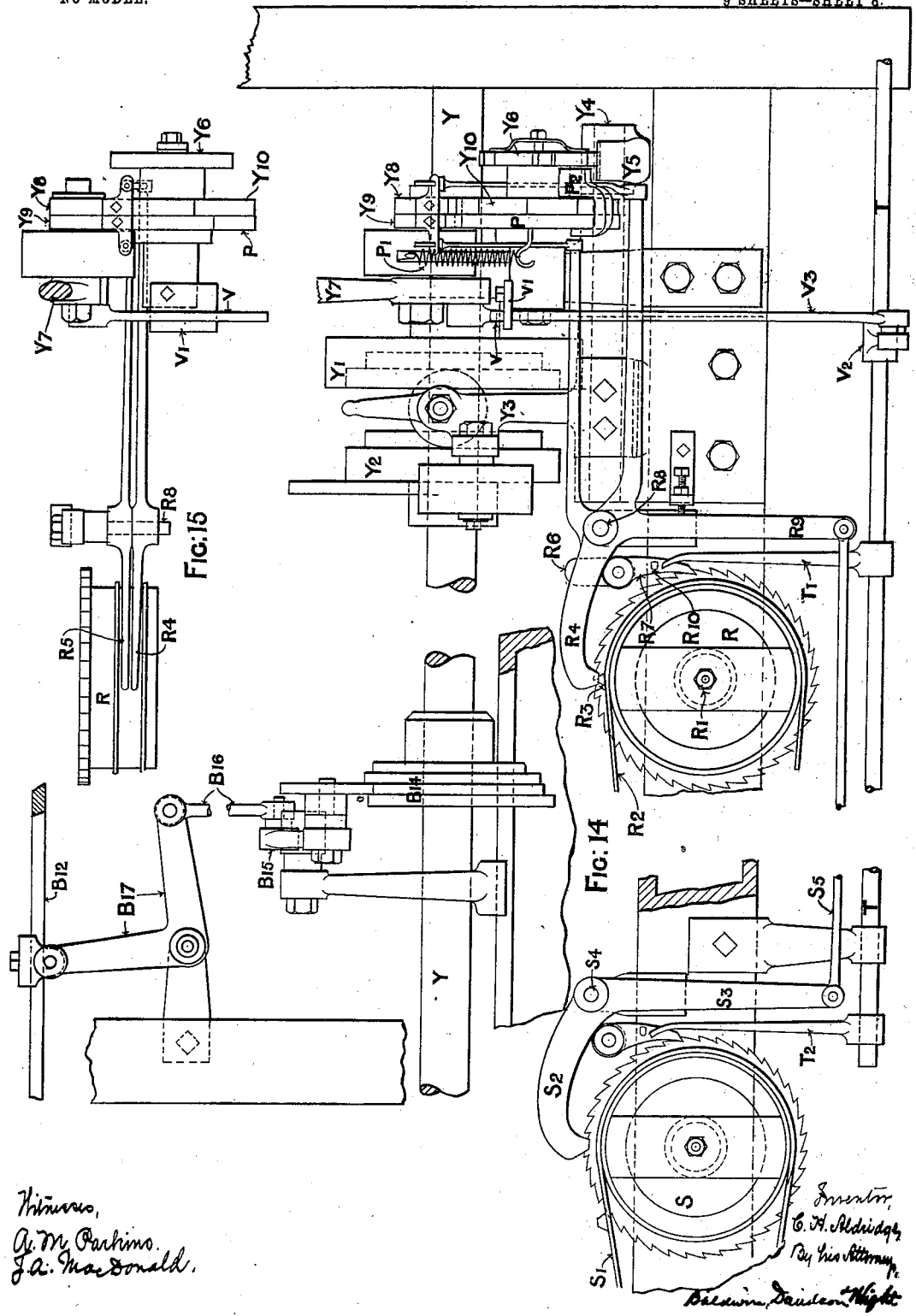

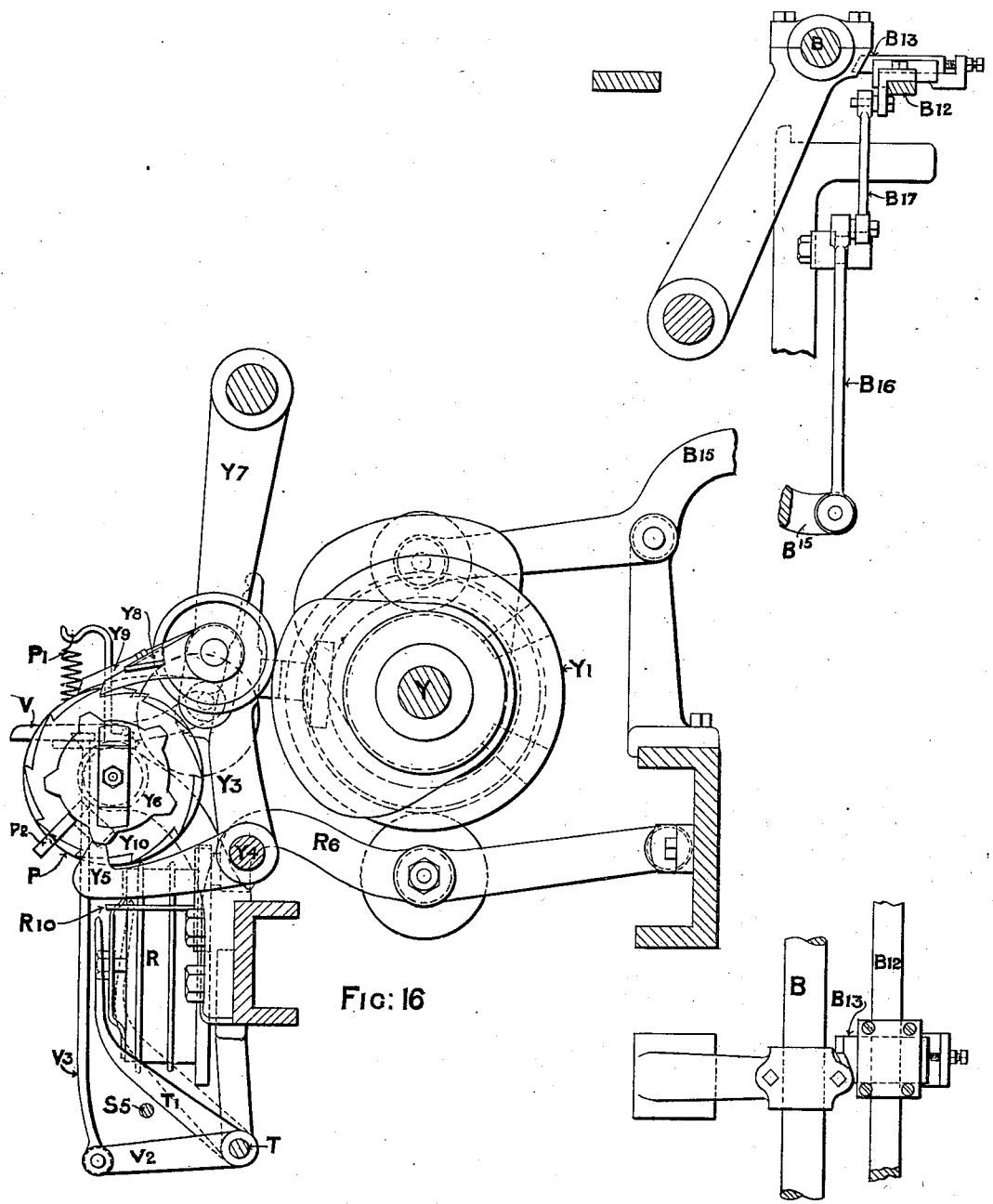

UNITED STATES PATENT OFFICE.

CHARLES HENRY ALDRIDGE, OF LOUGHBOROUGH, ENGLAND.

STRAIGHT-FASHIONING KNITTING-MACHINE.

SPECIFICATION forming part of Letters Patent No. 725,647, dated April 21, 1903.

Application filed February 10, 1902. Serial No. 93,452. (No model.)

*To all whom it may concern:*

Be it known that I, CHARLES HENRY ALDRIDGE, hosiery machinist, a subject of the King of Great Britain, residing at Pinfold Gate, Loughborough, England, have invented certain new and useful Improvements in Straight-Fashioning Knitting-Machines, of which the following is a specification.

This invention consists of certain improvements in rotary or straight-bar knitting-machines, and is particularly applicable to the type known as "Cotton's," where such are used or adapted for making lace or open-work hose, socks, underwear, and the like, as described in Patent No. 658,826, granted to me, as the assignee of E. Boesneck, October 2, 1900. In these machines I use fixed lacing-points carried by bars or fingers fast to a suitable rod carried by brackets which are fast to a shaft carried by the ordinary narrowing-machine and receiving the necessary endwise movements for the transfer of loops from needle to needle.

The main object of my invention is not only to enable lace or open-work, hose, socks, underwear, and the like (fully fashioned or otherwise) to be made by the operation of fixed lace-points and with the lacework or open-work running within a few needles of each selvage all through the fashionings, and also to enable lacework to be carried down the heels and instep, while at the same time the selvage of both the heels and instep or other partings may be properly formed, as described in my former patent, No. 658,826, but also to enable a good bracelet or border to be made when some only of the fixed lace-points come in action, while a far larger number of points are allowed to come into action when a repeating or following pattern is being made in a manner and by means hereinafter described, whereby a considerable increase of production is obtained. In order also to produce the necessary predetermined variable transferring movements of the lacing-points, I arrange a jacquard appliance at the end of the machine. This jacquard appliance consists of a band of cards which acts upon a certain predetermined number of droppers, which in turn act upon a slide to which the lacing finger-rod is suitably attached. The band of cards is set out, so that the odd numbers 1 3 5, and so on, form the heading or bracelet, and the even cards 2 4 6, and so on, form the repeating pattern. The band of cards is caused to move forward or rack in such a manner that when in action every other card is brought into action consecutively. Thus when making the heading or bracelet the odd cards 1 3 5, &c., are brought into action, and when making the repeating pattern numbers 2 4 6, &c., are brought into action. When the heading is completed, mechanism hereinafter described (acted upon by a special dropper, which in turn is acted upon by the cards) causes the band of cards to move forward one card only, thus bringing an even-numbered card into action. This card is the first of the repeating pattern, then the band of cards continues to advance two cards at a time, thus keeping the even cards in action. The band of cards also acts by special dropper upon two cam-levers so arranged and adjusted, as hereinafter described, that when one cam-lever is in action the selected loops are transferred to the right and when the other cam-lever is in action they are transferred to the left. Another special dropper acted upon by the band of cards I cause to control suitable mechanism, which causes the fashioning or lacing chain or chains to stop whenever more than one dip of the lacing-points is required in any one course, thus shortening and simplifying the lacing-chains. All these several variable movements of the several parts of the machine may be automatically controlled by the jacquard-cards, in combination with the studs set and arranged upon one or more chains, as fully described hereinafter.

The several improvements will be understood by referring to the accompanying drawings, where the mechanism relating thereto, together with some adjacent parts, is shown.

In the drawings I have only shown so much of a Cotton knitting-machine as is directly affected by my invention, the other parts (not shown) being similar to those used upon or in ordinary plain-knitting machines of the Cotton type, which is well understood by all conversant with knitting-machines.

Figure 1, Sheet 1, is a part section through the narrowing-machine and some adjacent parts. Fig. 2, Sheet 2, is a part front view of same. Fig. 3, Sheet 2, is a front view of the stopper-bar D, Fig. 2. Figs. 4 and 5, Sheet 2, show alternative arrangements of the stopper-bar D, Figs. 1, 2, and 3; and Fig. 6 is an end view of Fig. 5. Fig. 7, Sheet 3, is a part section of one portion of the narrowing and lacing machine. Figs. 8 and 9 are plans of parts of Fig. 7. Fig. 10, Sheet 4, is a front view of the jacquard arrangement by which the transverse movements of the lacing-points C are controlled. Fig. 10$^a$, Sheet 4, is a side elevation of one of the droppers. Fig. 11, Sheet 5, is a part plan of Fig. 10, Sheet 4. Fig. 12, Sheet 6, is a part end view of Figs. 10 and 11. Fig. 13, Sheet 7, is a plan of the truck-levers which are situated immediately below the jacquard mechanism shown in Figs. 10 to 13, Sheets 4 to 7, whereby the several movements of the said jacquard mechanism is effected. Fig. 14, Sheet 8, is a front view of the chain and shogging mechanism and some adjacent parts. This figure shows three portions of one machine, with parts which are between these portions omitted and the parts brought nearer to one another, so that the scale to which they are drawn may be larger than would otherwise be practicable. Fig. 15, Sheet 8, is a part plan of the fashioning-chain wheel and some adjacent parts. Fig. 16, Sheet 9, is a part end view and cross-section of Fig. 14, Sheet 8; and Fig. 17, Sheet 9, is a part plan of part of Fig. 16, Sheet 9.

In all the drawings in order to avoid confusion I have purposely left out parts of other views and adjacent parts which are not essential to make the particular parts described understood.

A, Fig. 1, Sheet 1, are the needles, A' the sinkers, and A$^2$ the knocking-over bits.

B' represents the narrowing-machine arms, which are fast to the shaft B. These arms carry the shaft B$^2$. To this shaft the brackets B$^3$ are attached. These brackets carry the sliding rods B$^4$ B$^5$, to which the fashioning-fingers B$^6$ B$^7$ are attached, the finger B$^6$ being fast to the rod B$^4$, and the finger B$^7$ being fast to the rod B$^5$.

B$^8$ represents the coverers or fashioning-points. The finger B$^6$ transfers the loops at the left-hand selvage, and the finger B$^7$ transfers the loops at the right-hand selvage in the usual well-understood manner.

The necessary rising and falling movements are imparted to the narrowing mechanism by means of cams and levers through the connecting-links B$^9$ in the usual well-understood manner and as explained in the before-mentioned patent.

C represents the lacing-points, carried by the bar or bracket C', which is fast to the lacing-point rod C$^2$. The rod C$^2$ is carried by arms or brackets C$^3$, which are fast to the shaft C$^4$, carried by the narrowing-machine arms B'. The said rod C$^2$ is free to slide endwise in the brackets C$^3$, but not to turn. A suitable bracket C$^5$ is fast at its lower end to the rod C$^2$, while its top end embraces the rod K'. This bracket C$^5$ thus prevents the rod C$^2$ from turning in the brackets C$^3$, but leaves it free to slide therein. A suitable supporting-bracket C$^6$ may be carried by the shaft B$^2$ and so adjusted that its lower end can support the lace-point bar when it is in action.

It will be seen that the coverers or fashioning-points B$^8$ are situated behind the lacing-points C. When the lacing-points C are in action, they are in the position shown in full lines in Fig. 1, and when the lacing-points C descend to transfer loops from the needles the coverer-points B$^8$ pass between the knocking-over bits A$^2$, but do not come into contact with the needles; but when a fashioning is desired the shaft C$^4$ is rocked by means of a cam and lever, (not shown,) which act through the connecting-rod C$^7$ and the arm C$^8$ so that when B is moved forward and is also rocked to cause the points to descend into their lowest position and C$^4$ is also rocked the brackets C$^3$, and consequently the points C, are brought into the position shown by dotted lines in Fig. 1, and the points C are thus put out of action, while at the same time the fashioning-points B$^8$ are brought into acting position. The moving forward of the shaft B is effected by the bar B$^{12}$ and the inclines B$^{13}$, which are brought into action by means (shown in Figs. 14 to 17, Sheets 8 and 9) of the cams B$^{14}$ on the cam-shaft Y, acting upon the truck-lever B$^{15}$ through the connecting-rod B$^{16}$ and the bell-crank lever B$^{17}$. These parts are all fully described in my former patent, No. 658,826.

The bar C' may be as wide as the full division of needles or fabric, and the lacing-points C may be arranged at any distance or number of needles apart in the bar C' to suit the pattern desired to be produced.

K K' are two rods capable of sliding in the brackets C$^3$. The rod K may be suitably connected to the finger-rod B$^4$ and the rod K' may be suitably connected to the finger-rod B$^5$, so that these two said rods K and K' may traverse endwise with their respective finger-rods.

K$^2$ is a stopper finger or bracket attached to the rod K, and K$^3$ is a similar finger attached to the rod K'. These two stopper-fingers act upon the heads of a certain predetermined number of needles at each outside selvage of the fabric, so as to prevent the lacing-points immediately behind them from removing loops from the needles when the lacing-points come into action, so as to insure a certain predetermined width of plain fabric down each selvage, as fully described in my former patent, No. 658,826. In a similar manner the narrow stopping-fingers L' L$^2$ may be attached to the rod L, also carried by the bracket C$^3$. These stopping-fingers when in action are situated just over the "instep" partings, so as to form plain fabric upon a certain predetermined number of needles at each of the heel and instep selvages, all as fully described in my former patent, as aforesaid.

When using fixed points carried by a straight bar for making lacework, such as described above and illustrated in my former patent, No. 658,826, there has been hitherto some considerable loss of production, especially when making a heading or bracelet followed by a repeating pattern, owing to the fact that in order to make a good heading or bracelet it is necessary to have only a few lacing-points in action, whereas to make a good repeating pattern without having to lower the narrowing-machine many times in each lace course it is desirable to have a much larger number of points in action. The reason for this is that for complicated patterns only a few points can be used, and these few points must be shifted sidewise to and fro and often made to act many times in succession in each lace course. Many points could not be used for such patterns, because when some points were brought into positions to take loops from some needles for forming the pattern desired other points would be brought into positions for taking loops from other needles from which it is not desired to remove loops, whereas for other repeating patterns many points can be made to take loops simultaneously from the needles. These repeating patterns could be produced with the few points used for making the complicated pattern, but then they would have to be used many times in succession, which would take up time and would reduce the amount of work that could be produced on the machine. Now the first part of my invention is to overcome this difficulty. This I do as follows: I place as many points in the point-bar as may be desirable to produce a good repeating pattern, with one dip of the narrowing-machine. I then arrange a bar or equivalent D, Figs. 1, 2, and 3, Sheets 1 and 2, in front of these points carried by suitable arms or brackets D' D' from a suitably-located rocking shaft or rod D², carried by the bracket C³ and coupled to the rod C², so that when C² is moved endwise D² moves endwise with it. On the lower edge of the said bar I cut a series of notches or spaces D³, Fig. 3, so that each notch or space will be as wide as one or more needles and placed at a predetermined number of needles apart. In the drawings, Fig. 1, this bar D is shown in its out-of-action position, so as to show it more distinct from the stopper-bars K² K³ and L' L²; but it will be understood that when the bar D is brought into action the stoppers L' L² are turned up out of action, and the bar D occupies the same relative position to the needles as the said stoppers K² K³ and L' L², and when the said bar D is in action it comes between the stoppers K² and K³. Now it will be seen that when the narrowing-machine descends in a lacing course for the lacing-point to remove loops from the selected needles the lower edge of the bar D catches the heads of the needles which are not opposite the spaces D³ and holds them forward, thus preventing the lacing-points opposite the held-off or stopped needles from removing loops. Now it will be seen that if this said bar be brought into action during the formation of the heading or bracelet only a few points will come into action—that is, those opposite the notches or spaces—while those points not opposite the notches or spaces will be out of action. Then when the repeating pattern is started the said bar may be turned up out of action, and all the lacing-points will then be free to produce the repeating pattern desired.

In some cases instead of using a bar with notches or spaces cut in its edge I use a suitable plain bar and screw or otherwise fasten thereto a number of adjustable stop-pieces to engage with the heads of the needles in the same manner as the said notched bar. Fig. 4, Sheet 2, shows such a bar. D⁴ is a plain bar to which may be screwed or otherwise attached plates D⁵, between which suitable intervals or spaces D³ are left. It will be seen that such a bar may be made to act precisely as the bar D, hereinbefore described.

In some cases instead of the notched bar D or the adjustable arrangement shown at Fig. 4 I use a point-bar D⁶, Figs. 5 and 6, similar to a lacing-point bar and situated in a similar position to the bar D; but instead of using ordinary coverer or lacing points I use points similar to a lacing or coverer point, but with the extreme end removed, as indicated in Figs. 5 and 6, so that the eye of the point is left to act as a coverer for the head of the needle. It will be readily understood that these special coverers may be placed and arranged in the bar so as to cover as many needles as desired, as and for the purpose hereinbefore described. It will be evident that this arrangement of stopper-bar may be adapted for and brought into action, either by hand or automatically, at certain recurring intervals, so as to produce horizontal stripes or bands of entirely distinct types of lacework.

When either of the several stoppers D K² K³ or L' L² hereinbefore described are in action, it is necessary after the selected loops have been removed from their respective needles that the said stoppers should be moved a little forward from the lacing-points, so that when the machine descends the second time to deliver the selected loops to their appointed needles the said stoppers may pass just clear of the knocking-over bits. For this purpose the shafts or rods K, K', L, and D² require a small rocking movement. It is also desirable that the stops on the two rods L and D² should be able to be turned right up out of action. This may be effected as shown in Figs. 7 to 9, Sheet 3. A short rocking shaft E may be situated at any convenient part of the narrowing-machine, preferably near the middle, an arm E' may be fast to this shaft, and a connecting-rod E², jointed to the end of the arm E′, may be connected to a suitable cam-lever, (not shown,) whereby a rocking movement may be imparted to the said shaft E. Two or more other arms E³ may be fast to the rocking shaft E, and these arms E³ may carry a rod E⁴. An arm K⁴ may be fast to the rod K, and a connecting-rod K⁵ may connect the end of the arm K⁴ with the rod E⁴, by which means the necessary rocking movement may be imparted to the shaft K, and consequently to the stopper K². In like manner the necessary rocking movement may be imparted to the stopper K³ by means of the arm K⁶, which is fast to the rod K′, and the connecting-rod K⁷, which attaches the arm K⁶ to the rod E⁴. Similarly an arm L³ and a connecting-rod L⁴, also attached to the rod E⁴, and the arm D⁷ and connecting-rod D⁸, likewise attached to the rod E⁴, imparts the necessary rocking movement to the two rods L and D², respectively.

It is desirable that the stoppers carried by the two rods L and D² should be capable of being turned right up out of the way into such a position as indicated by the stopper D in Fig. 1. This may be effected as follows: The arm D⁷, I make as one member of a bell-crank lever, the other member being D⁹, Figs. 7 and 8. This bell-crank D⁷ D⁹ is free on the rod D². Another arm D¹⁰ is fast to the rod D². The end of the arm D⁹ carries a spring-bolt D¹¹, which engages with the end of the arm D¹⁰. It will now be seen that when the two arms D⁹ and D¹⁰ are locked together by the bolt D¹¹ the rod D², and consequently the stoppers attached thereto, will receive the necessary rocking movement hereinbefore described. Then when the bolt D¹¹ is drawn clear of the arm D¹⁰ the rod D² and all carried thereby can be turned up out of action, as hereinbefore described. In like manner the arm L³ may be connected to its rod L, as shown in Figs. 7 and 9.

In order to provide the necessary endwise movements to the lacing fingers or brackets, the arrangement described in my former patent, No. 658,826, may be used; but where a great variety of patents are desired I prefer to use a jacquard arrangement. This will be understood by referring to Figs. 10 to 13, Sheets 4 to 7.

The lace finger-rod C² (see Fig. 10) is connected to an upright or bracket F by the brackets or fingers C⁴ C⁴. The said bracket F is attached to a slide F′, which can slide endwise in the fixed bed F². A second slide F³ may slide in the same bed. The slide F³ acts upon and controls certain movements of the slide F′, as hereinafter described. At the outer or right-hand end of the bed F² are a series of droppers. The six marked X X in plan in Fig. 11, Sheet 5, are in this case used to control the slide F³. These droppers work in vertical grooves and are stepped on one edge at the top with two or more steps. In this case there are three, as shown in Fig. 10ᵃ, sheet 5, where a side elevation of one of the droppers X is shown. Each step or face X′ X² X³ may be as far above or below its adjacent step or face as from center to center of two adjacent needles of the machine. Attached to the end of the slide F³ is fixed a stepped plate F⁵, Figs. 10 and 11, having one step opposite each dropper X. Each of these steps may be the same distance above or below its adjacent step as from center to center of a fourth adjacent needle—i. e., a step equal to a three-needle shift. It will now be seen that if the said slide F³ be drawn toward the droppers by a suitable spring, hereinafter explained, it will take up and retain for the time being certain varying positions (in this case eighteen) in the bed F², according to the particular dropper which may be lifted into action—i. e., so as to bring one or other of the faces X′ X² X³ opposite its corresponding step on the plate F⁵.

The droppers are controlled by means of a set of cards G, Figs. 10 and 12, Sheets 4 and 6. G′ is the card-cylinder, by means of which the cards are presented. G² is an arm or bracket which carries the card-cylinder G′. This arm G² works upon a pin G³, carried by the bracket G⁴, which may be fast to the bed F². A connecting-rod G⁵ connects the said arm G² with a truck-arm G⁶, Fig. 13, Sheet 7. This truck-arm G⁶ receives a lifting movement by means of the truck G⁷, running on the cam or cams G⁸. Thus by the action of the said cam or cams G⁷ the card-cylinder G′ (and consequently the cards carried thereby) is raised into the position indicated by dotted lines in Fig. 10 and the droppers are raised, according to the holes in the card G. It will be seen that the dropper X, Fig. 10ᵃ, Sheet 4, having three working faces X′, X², and X³, is provided with three different lengths of pins X⁴ X⁵ X⁶, corresponding with its three working faces. It will be seen that the cards G, Fig. 12, Sheet 6, are provided with holes corresponding with the said pins under each dropper, so that if the three holes under any particular dropper be punched out then the said dropper will not be lifted. Then if two holes be punched out the dropper will be lifted into its first position, bringing into action the face X³, Fig. 10ᵃ. If one hole only be punched out, it will be lifted into its second position and the face X² will come into action, and if there be no holes under the said dropper then the third face X′ will come into action.

It will be understood that instead of using a dropper, as described with reference to Fig. 10ᵃ, three or more droppers may be used, working one behind the other in a precisely-similar manner to an ordinary jacquard apparatus, as is well understood; but I prefer to use the droppers arranged as hereinbefore described. The method of rotating the card-cylinder G′ in this case is as follows: G⁹, Fig. 10, is a ratchet or rack and is jointed upon the fixed pin or stud G¹⁰. A rack-wheel G¹¹ is fast to the shaft or pin which carries the cylinder $G'$. A spring $G^{12}$ retains the ratchet $G^9$ in contact with the rack-wheel $G^{11}$. It will be seen that by the downward movement of the arm $G^2$ carrying the cylinder $G'$ the said cylinder $G'$ is rotated by the rack $G^9$, and the band of cards is thereby advanced.

When making lacework in a knitting-machine, it is not only necessary to select the loops to be removed from their needles, but also the direction in which they are to be transferred—viz., a distance of one or more needles to the right or left. This I effect as follows: H is a bracket fast to the slide $F^3$, Figs. 10 and 11, Sheets 4 and 5. Jointed in this bracket are two levers $H'$ $H^3$ and $H^2$ $H^4$, working side by side. Upon the slide $F'$ another bracket $F^6$ is fixed, and this bracket carries a truck or roller $F^7$, Fig. 11. This truck comes in contact with the ends $H^3$ $H^4$ of the levers $H'$ $H^3$ and $H^2$ $H^4$ and is held in contact therewith by means of a spring, such as indicated at W, Fig. 10, which acts upon the end $W'$ of the lever $W'$ $W^2$, which lever is jointed upon a pin or axle $W^3$. The upper end $W^2$ of the lever $W'$ $W^2$ acts upon the slide $F'$, and thereby keeps the truck $F^7$ in contact with the levers $H'$ $H^3$ and $H^2$ $H^4$. The end $H^3$ of the lever $H'$ $H^3$ may be so shaped that when the end $H'$ is lifted it allows the slide $F'$ to move a distance of, say, one needle to the right, and the end $H^4$ of the lever $H^2$ $H^4$ is so shaped that when the end $H^2$ is lifted the slide $F'$ is moved, say, one needle to the left. Thus by lifting the ends $H'$ $H^2$ of the said levers the slide $F'$ is moved by the action of $H^3$ $H^4$ on the roller $F^7$, and consequently the lacing-points connected thereto, as hereinbefore described, and the loops are transferred either to the right or left, as desired, in whatever position the slide $F'$ may be as governed by the droppers acting through the slide $F^3$, as hereinbefore described. To the ends $H'$ $H^2$ of the said levers connecting-rods $H^5$ and $H^6$ are attached, Figs. 10, 11, and 12, Sheets 4, 5, and 6. The lower parts of these connecting-rods pass freely through one end $H^7$ of a bell-crank lever $H^7$ $H^8$, Figs. 10 and 12. This bell-crank lever may be jointed on a fixed pin or axle $H^9$. A lever $H^{11}$ is jointed upon a fixed pin or axle $H^{12}$ and at its other end carries a pin or axle $H^{13}$, which, as shown in Fig. 12, is immediately below the connecting-rod $H^5$. The end $H^8$ of the said bell-crank lever $H^7$ $H^8$ rests upon the top of a dropper $H^{10}$, Figs. 11 and 12, which is acted upon by the set of cards. Thus when there is a hole in the card below the dropper $H^{10}$ the connecting-rod $H^5$ remains, as shown, over the pin $H^{13}$; but when there is no hole in the card for the dropper $H^{10}$ the card lifts the dropper $H^{10}$, and consequently the end $H^8$ of the bell-crank lever $H^7$ $H^8$ also, whereby the end of the connecting-rod $H^5$ is moved from above the pin $H^{13}$ and the end of the connecting-rod $H^6$ is brought over the said pin $H^{13}$. A connecting-rod $H^{14}$ connects the lever $H^{11}$ with the truck-arm $H^{15}$, Fig. 13, Sheet 7, which carries the truck $H^{16}$, running on the cams $H^{17}$, whereby a lifting movement is imparted to the lever $H^{11}$ to the extent required to lift the hereinbefore-described levers $H'$ $H^3$ and $H^2$ $H^4$. Thus it will be seen that the six droppers marked X (as arranged in this particular illustration) govern the selection of loops to be transferred and the dropper $H^{10}$ the direction right or left in which they are transferred.

During the time that the droppers are being moved by the cards before each selection it is necessary that the stepped plate $F^5$ on the slide $F^3$ should be clear of the droppers. This I effect as follows: A bell-crank lever $J$ $J'$ works upon the fixed pin or axle $J^2$, Figs. 10 and 11, Sheets 4 and 5. A connecting-rod $J^3$ connects the end $J$ with the truck-lever $J^4$, Fig. 13, Sheet 7. This lever carries the truck $J^5$, which is acted upon by the cams $J^6$. To the end $J'$ of the bell-crank lever $J$ $J'$ a connecting-rod $J^7$ is attached. The other end of the said connecting-rod is connected to the pin $J^8$, upon which the two levers $H'$ $H^3$ and $H^2$ $H^4$ work, (or to other convenient part or attachment of the slide $F^3$.) Now it will be seen that by the action of the cam or cams $J^6$, Fig. 13, the slide $F^3$ may be drawn clear of the droppers during their movement by the cards, as hereinbefore described. A small stop-screw or equivalent $J^9$, Figs. 10 and 11, may be placed in the bracket F and so adjusted that it comes in contact with the end of the connecting-rod $J^7$ at the time it comes into action in such a manner that the slide $F'$ is held thereby sufficiently clear of the slide $F^3$ to hold the truck or roller $F^7$ on the slide $F'$ just clear of the ends $H^3$ $H^4$ of the levers $H'$ $H^3$ and $H^2$ $H^4$, so as to allow the said levers to assume their normal position before each fresh selection.

In some cases it is desirable to produce two distinct patterns following one another on one piece of fabric—for example, the bracelet or beading and the repeating pattern in a lace hose, sock, or the like. Now instead of having a long band of cards to cover the whole length of fabric desired I use a short endless band of cards constructed as follows: Suppose a case where a heading or bracelet is required which will take thirty cards and a repeating pattern for one or more complete repeats—say thirty-four. Then I lace these cards up as follows: Starting with the cards for the heading I place them as Nos. 1, 3, 5, 7, &c., finishing up with (in this case) four blank cards. Then the last card of the heading will be numbered "59." Then I start the repeating pattern on the next even card—viz., No. 60. Thus we have an endless band of sixty-eight cards, the odd numbers up to fifty-nine being the heading and the even numbers throughout the band of cards being the repeating cards. Now it will be seen that if No. 1 card be brought into action and then the card-cylinder be racked two flats, or half a revolution at each racking, the odd cards will be brought into action in consecutive order. This proceeds until No. 59 card is presented, when special mechanism, hereinafter described, causes the card-cylinder to be racked one flat only at this particular racking. This brings No. 60 card into action, which is the first card of the repeating pattern. After this the cylinder is continuously racked two flats at a time, thus missing the heading-cards, but presenting the repeating cards as long as desired. It will be seen that in a precisely similar manner three or more distinct patterns may be arranged in one band of cards, any one of which may be brought into action as a repeating pattern automatically or at the will of the attendant, the cards of the pattern or patterns not in action being passed over. The mechanism for effecting this will be understood by referring to Figs. 10 and 11, Sheets 4 and 5. It has been hereinbefore explained how the ratchet $G^9$, acting upon the rack-wheel $G^{11}$ as the arm $G^2$, carrying the cylinder $G'$ descends, causes the cylinder $G'$ to rotate. Now in this case sufficient motion is provided in the arm $G^2$ to cause the cylinder to rotate two flats, or half a revolution, after each selection, whereby each alternative card is presented, so that starting on No. 1 card the odd numbers only would be presented, the even numbers being passed over. Now in order to change from the odd to the even cards automatically, as above described, I use a special dropper M, Figs. 10, 11, and 12, Sheets 4, 5, and 6. This dropper is acted upon by the cards. A double or bell-crank lever $M'$ $M^2$ is jointed upon the pin or axle $M^3$, carried by the bracket $M^4$, which in turn is carried by the bed $F^2$. The dropper M acts upon the end $M'$ of the said lever. It will be seen that the end $M^2$ is formed as a hook. The pin or axle $G^{13}$ in the arm $G^2$, to which the connecting-rod $G^5$ is attached, may be prolonged, so as to be able to engage with the hooked end of the lever $M^2$. Now when there is no hole in the card below the dropper M the dropper will lift the end $M'$ of the lever $M'$ $M^2$, so that its hooked end will be held clear of the pin $G^{13}$; but when there is a hole in the card below the dropper M the hooked end $M^2$ falls below the pin $G^{13}$ and prevents the arm or lever $G^2$ from falling to its lowest position, but just far enough to cause the cylinder to rack one flat, or quarter of a revolution, only. Thus it will be seen that, taking the example of cards hereinbefore described, if No. 59 card is provided with a hole for the tail of the dropper M to fall into the band of cards will be advanced one card only, thus bringing No. 60 into action. Then if the following cards have no holes in them below the dropper M the band of cards will advance two cards at each racking, and thus all the even cards will be brought into action and the odd cards passed over until another hole appears below the dropper M or the order be altered by the attendant. A suitable notched wheel $G^{14}$ may be fast upon the same pin or spindle or axle with the cylinder $G'$. A suitable retaining-spring $G^{15}$, Fig. 10, may be fast to the lever $G^2$ and act upon the notched wheel $G^{14}$, thereby retaining the said card-cylinder in its correct position in relation to the droppers as placed at the end of each racking movement.

In some cases it is desirable that the lacing-points should come into action several times in one course of lacework. In such a case it has hitherto been necessary to set out the studs upon the chain which controls the number and order of lacing courses, so as to provide for these extra dips of the lacing-machine. This makes the chains complicated and correspondingly costly. To avoid this, I arrange the studs on the chain simply to control the number and order of lacing courses irrespective of the number of dips of the lacing-machine. I provide an additional dropper or droppers to be acted upon by the jacquard-cards before mentioned. This dropper or droppers is suitably connected by a lever and connecting-rod to a rocking shaft or other suitable connections to stops which act upon the ratchet, which racks the chain or chains in such a manner that when the lacing-points are required to make more than one transfer at any particular lacing course the card or cards then brought into action stop the lacing-chain while the lacing-points make their desired number of transfers, all controlled automatically by the cards in action. This will be understood by referring to Figs. 14 to 17, Sheets 8 and 9. Y is the cam-shaft, which I prefer to arrange to shog or shift endwise into three different positions, so as to bring into action three different sets of cams, one set of cams being used for the plain course, another set for the lacing course, and the third set for the fashioning course. $Y'$ $Y^2$ are the shogging cams, $Y^3$ the shogging arm, fast to the rocking shaft $Y^4$, Figs. 14 and 16, carrying the usual truck to act upon the faces of the shogging cams. It will be seen and well understood that these cams present three working faces for the said truck to act upon, so that by rocking the shaft $Y^4$ in the usual well-understood manner the said truck is brought opposite either of these faces, and the cam-shaft is thereby shifted into whichever position is desired. $Y^5$, Figs. 14 and 16, is the usual arm fast to the rocking shaft $Y^4$. This arm $Y^5$ is acted upon by the usual stepped wheel $Y^6$ for two positions of the cam-shaft—in this case the plain course and the lacing course. The third or fashioning position I control as hereinafter described.

$Y^7$ is the usual racking-arm worked by a suitable cam and truck and carries two pawls $Y^8$ $Y^9$, the ratchet $Y^8$ acting upon the rack-wheel $Y^{10}$, which is connected to the stepped wheel $Y^6$ in the usual manner, and the pawl $Y^9$ acting upon a special wheel P, working at the side of and freely upon the rack-wheel $Y^{10}$. The said wheel P does not revolve, but receives a simple impulse or movement by the pawl $Y^9$ and is then drawn back into its normal position against a suitable fixed stop by the spring P'. A bracket $P^2$ is fast to the wheel P and is so adjusted that when the pawl $Y^9$ acts upon the wheel P the end of the bracket $P^2$ comes above the nose of the lever $Y^5$ and holds it in its third position, whereby the cam-shaft is caused to shog or shift into its third or fashioning position, as hereinbefore described.

R is a chain-wheel working upon a pin or axle. R' $R^2$ represents the chain, and $R^3$ studs, such as commonly used and well understood by all conversant with knitting machinery.

$R^6$ is the chain-wheel racking-lever, and $R^7$ is the pawl, all of which is well understood.

$R^4$ $R^5$, Figs. 14 and 15, are two levers working or rocking upon the pin or axle $R^8$. These two stud-levers are acted upon by two independent rows of studs upon the chain $R^2$. The stud-lever $R^4$ is connected to the pawl $Y^8$, and so controls the lacing courses, as hereinbefore described, and the stud-lever $R^5$ is connected to the pawl $Y^9$, and so controls the fashioning courses, as also hereinbefore described.

In some cases I use a second chain-wheel S, Fig. 14, carrying a chain S'. A bell-crank lever $S^2$ $S^3$ rocks upon the pin or axle $S^4$, the end $S^2$ being acted upon by the studs on the chain S' and the other end $S^3$ being connected by the rod $S^5$ to the lower end $R^9$ of the lever $R^4$, so that when the chain S' is in action the lever $R^4$ is also in action, and consequently the lacing courses may be controlled by studs upon either the chain $R^2$ or the chain S'. The chain $R^2$, I generally set out with studs to act upon the lever $R^5$, so as to produce the fashionings in the order desired, and with studs to act upon the lever $R^4$, so as to regulate the number of courses between each lacing course in the heading or bracelet of the lacing design. The chain S' is generally a short chain with studs set out to regulate the number of courses between each lacing course in the repeating pattern. Either chain may be stopped or started by the attendant, as desired, by well-understood arrangements. (Not shown.) Both chains are automatically stopped by the cards when more than one dip per course of the lacing or narrowing machine is required, as now to be described.

T, Figs. 14 and 16, Sheets 8 and 9, is a rocking shaft which is rocked by the cards, as hereinafter described. An arm T' is fast to the said rocking shaft. A pin $R^{10}$ projects from the chain-wheel pawl $R^7$. When the arm T' is in the position shown in full lines in Fig. 16, it will be clear of the said pin $R^{10}$, and the chain will continue to be racked forward; but when the said shaft T is rocked so as to bring the arm T' into the position indicated by dotted lines in Fig. 16 the top end of the arm T' will catch the pin $R^{10}$ and hold the pawl $R^7$ out of action, so that as long as the arm T' is in its dotted position the chain does not move. In a similar manner another precisely similar arm $T^2$ stops the chain S'. While the chains are stopped, it is necessary in this case that the stepped wheel $Y^6$ should be stopped also. This I effect as follows: A latch V, Figs. 14 and 16, is jointed to the lower end of the rocking arm $Y^7$ and slides upon the bracket V', Fig. 14. An arm $V^2$ is fast to the rocking shaft T. To the end of the arm $V^2$ a rod $V^3$ is attached. The top end of this rod passes through the bracket V' and is so adjusted that when the rocking shaft T is in the position to hold the arm T' as shown in full lines in Fig. 16 the top end of the said rod $V^3$ is just below the surface of the bracket V'. Then when the rocking shaft T is turned so as to place the arm T' in the position indicated by dotted lines in Fig. 16 the top of the said rod $V^3$ will project above the said bracket V'. On the under side of the latch V, I cut a suitable catch or recess, so that when the rod $V^3$ is raised it engages with the said latch or catch and holds the rocking arm $Y^7$ forward, and so prevents the stepped wheel $Y^6$ from being racked while the chains are standing.

The rocking shaft T is worked from the chain as follows: An arm $T^3$, Fig. 12, Sheet 6, is jointed on a pin or axle $T^4$. (I have omitted this arm from Fig. 11 to avoid confusion.) To the other end of the said arm $T^3$ a connecting-rod $T^6$ is jointed. The lower end of this connecting-rod is jointed to an arm $T^7$ on the rocking shaft T, Figs. 14 and 16, Sheets 8 and 9, so that by rocking or moving the said arm $T^3$ the rocking shaft T is rocked also and the chain or chains and the shogging rocking lever are stopped or started, as hereinbefore described.

$T^5$, Fig. 12, Sheet 6, is a special dropper acted upon by the cards G. One end of the said arm $T^3$ comes in contact with the top of this dropper. Now it will be seen that when there is no hole in the card below the dropper $T^5$ the said dropper will be lifted by the cards and the connecting-rod $T^6$ will be lowered, whereby the rocking shaft T, Figs. 14 and 16, is rocked, and the levers T' and $T^2$ thereon are brought into the position shown in full lines in Fig. 16, and when there is a hole in the card below the dropper $T^5$ the connecting-rod $T^6$ at the end of the lever $T^3$ is raised by suitable spring or balance-weight (not shown) on the rocking shaft T, and the arms T' $T^2$ on the rocking shaft T take the position shown in dotted lines in Fig. 16, and thus it will be seen that when there is a hole in the card below the dropper $T^5$ the chain and shogging racking will be stopped for that particular revolution of the cam-shaft in which the card having the special hole is in action, and thus when the narrowing or lacing machine is required to make several dips to form one lace course each card (expect the last of the series) which comes into action at each revolution of the cam-shaft or dip of the machine is provided with a hole for the dropper T⁵ and the chain and shogging racking is stopped until the last card for each series of dips is presented, when this card has no hole under the dropper T⁵, the chains and shogging racking are thereby again started, as hereinbefore described.

What I claim is—

1. The combination of a needle-bar, a lacing-point bar having fixed to it a number of lacing-points for taking loops from some needles and transferring them to others, a bar movable endwise to and fro together with the lace-point bar, instruments carried by this bar for holding forward the needles with which some of the points would act and so prevent these points from taking loops from these needles.

2. The combination of rod C² carrying lacing-points, rods K K' carrying instruments K² K³, the fashioning-point rods B⁴ B⁵ to which they are coupled, the rod L carrying instruments L' L², the rod D² carrying bar D, means for giving a partial turn to these rods immediately after the points have removed the loops from the needles and before they have been transferred to others, and means for putting rods L and D² entirely out of action.

3. The combination of a series of jacquard-cards, a series of droppers, means whereby the cards can be brought one by one against the droppers, one card at each revolution, a slide held up to the droppers, a stepped surface on the slide, one step opposite to one or more of the droppers, means for moving the slide away from the droppers each time that a fresh card is to be brought against them and a lacing-point bar moved endwise to and fro by the movement of the slide.

4. The combination of a series of jacquard-cards, a series of droppers each having a series of steps formed upon it and each having a number of pegs of different lengths projecting from it and adapted to enter holes in the cards.

5. The combination of a needle-bar, a lacing-point bar, lacing-points fixed to it, a series of jacquard-cards, a series of droppers, means whereby the cards can be brought one by one against the droppers, a stepped stopping-surface on each dropper, a slide movable toward and away from the droppers having upon it a stepped plate, one step opposite to one or more of the droppers, a second slide movable to and fro with the first, a lacing-point rod coupled to the second slide, two levers mounted on the first slide, a spring holding the second slide up to the ends of these levers, inclines on the ends of the levers such that when one lever is rocked the second slide is moved a distance away from the first and when the other lever is rocked is allowed to move toward it, means for rocking either one or other lever, and means for moving first slide away from the droppers, and the second slide away from the ends of the levers when levers and droppers are to be set in new positions.

6. The combination of a needle-bar, a lacing-point bar, lacing-points fixed to it, a series of jacquard-cards, a series of droppers, means whereby the cards can be brought one by one against the droppers, a stepped stopping-surface on each dropper, a slide movable toward and away from the droppers having upon it a stepped plate, one step opposite to one or more of the droppers, a second slide movable to and fro with the first, a lacing-point rod coupled to the second slide, two levers mounted on the first slide, a spring holding the second slide up to the ends of these levers, inclines on the ends of the levers such that when one lever is rocked the second slide is moved a distance away from the first and when the other lever is rocked is allowed to move toward it, a rod descending from each lever, a rocking lever through which the lower ends of both rods pass freely, a dropper acted upon by the jacquard-cards for rocking this lever into one or other of two positions, a lifting-lever above the end of which the lower end of one rod is brought when the rods are in one position and the other rod when in the other, and cam on cam-shaft for rocking the lifting-lever to raise whichever rod is above it.

7. The combination of the droppers each having a series of steps formed in it and pegs of different lengths projecting from it, the jacquard-cylinder, means for moving the jacquard-cylinder toward and away from the pegs on the droppers, the endless band of perforated jacquard-cards passing around the jacquard-barrel and made up with alternate cards adapted for producing one pattern and the other cards another pattern, means for turning the jacquard-barrel two steps at a time to shift the cards forward two cards at a time so long as one pattern is being produced and means for turning it one step only at the time when a change is to be made from one pattern to the other.

8. The combination of the droppers, the jacquard-cylinder, the jacquard-cards, means for moving the cylinder toward and away from the droppers, a ratchet-wheel fast with the cylinder, a toothed rack held against the ratchet-wheel and adapted to turn it when the cylinder descends away from the droppers, a catch by which the cylinder can be stopped from making its complete downward movement, means for normally holding this catch out of action, a lever by which the catch can be moved into acting position and a dropper acted upon by the jacquard-cards for acting upon this lever.

9. The combination of the pattern-chain, studs carried by it for controlling whether each course is to be a work-producing course or a loop-shifting course, a wheel supporting the chain, a ratchet-wheel fast with the wheel, a to-and-fro reciprocated pawl for giving a step-by-step movement to the ratchet-wheel, a stop by which the pawl can be held out of action, a dropper, jacquard-cards for acting on the dropper, mechanism interposed between the dropper and the stop by which the movements of the stop are controlled by the dropper whereby any desired number of jacquard-cards can act in succession upon the droppers while the pattern-chain remains at rest.

10. The combination of a continuously-revolving main cam-shaft, a pair of cam-disks fixed upon the shaft, with a space between them three concentric cam-tracks on the faces of these disks which are opposite one another, a truck in the space, a shogging arm by which it is carried, a rock-shaft incapable of endway movement to which the shogging arm is fixed, another arm fast on the shaft, a stepped cam-wheel acting on this arm to cause the truck to be brought into position to be acted on either by one or the other of two of the cam-tracks, a ratchet-wheel fast with the stepped cam-wheel, a to-and-fro oscillated "racking-arm," a pawl carried by it for giving a step-by-step turning movement to the ratchet-wheel, a second pawl also carried by the racking-arm, a wheel acted on by this second pawl and turned by it in one direction a spring turning the wheel in the opposite direction and normally holding it in one fixed position, a bracket upon the wheel which when the wheel is turned by the pawl acts upon the arm $Y^5$ and holds the truck in position to be acted on by the third cam-track, two levers for holding the pawls out of action, a pattern-chain, studs carried by the chain acting upon the levers to cause either one or other to allow the pawl with which it works to come into action a wheel supporting the pattern-chain, a ratchet-wheel fast with the wheel, a to-and-fro reciprocated pawl for giving a step-by-step turning movement to this ratchet-wheel, a rock-shaft, arms fixed on this shaft, stops actuated by these arms, one for holding the pawl out of action and another to stop the "racking-arm" from being moved to and fro, a dropper, jacquard-cards for acting on the dropper, mechanism interposed between the dropper and an arm on the rock-shaft by which this shaft can be rocked by the movement of the dropper.

CHARLES HENRY ALDRIDGE.

Witnesses:
  J. HANDS,
  C. E. MINUS.